(12) United States Patent
Kim et al.

(10) Patent No.: US 10,856,163 B2
(45) Date of Patent: Dec. 1, 2020

(54) METHOD FOR PERFORMING MEASUREMENT AND DEVICE SUPPORTING THE SAME

(71) Applicant: LG Electronics Inc., Seoul (KR)

(72) Inventors: Sangwon Kim, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/014,597

(22) Filed: Jun. 21, 2018

(65) Prior Publication Data

US 2019/0014492 A1 Jan. 10, 2019

Related U.S. Application Data

(60) Provisional application No. 62/529,477, filed on Jul. 7, 2017.

(51) Int. Cl.
| | |
|---|---|
| *H04W 24/10* | (2009.01) |
| *H04W 76/27* | (2018.01) |
| *H04W 36/08* | (2009.01) |
| *H04L 5/00* | (2006.01) |
| *H04W 68/02* | (2009.01) |
| *H04W 24/08* | (2009.01) |
| *H04W 36/00* | (2009.01) |

(52) U.S. Cl.
CPC ............ *H04W 24/10* (2013.01); *H04L 5/001* (2013.01); *H04L 5/0053* (2013.01); *H04W 36/08* (2013.01); *H04W 68/02* (2013.01); *H04W 76/27* (2018.02); *H04L 5/005* (2013.01); *H04W 24/08* (2013.01); *H04W 36/0085* (2018.08)

(58) Field of Classification Search
CPC ............ H04W 24/10; H04W 72/0413; H04W 72/042; H04W 88/02; H04W 88/08; H04W 72/085; H04W 24/08; H04W 76/27
See application file for complete search history.

(56) References Cited

U.S. PATENT DOCUMENTS

| | | | |
|---|---|---|---|
| 2013/0016702 A1* | 1/2013 | Yan ..................... | H04W 24/08 370/331 |
| 2013/0040659 A1* | 2/2013 | Van Der Velde ..... | H04W 24/10 455/456.1 |
| 2013/0196650 A1* | 8/2013 | Futaki ................... | H04W 24/10 455/424 |
| 2014/0313920 A1* | 10/2014 | Chai ..................... | H04W 24/10 370/252 |
| 2016/0021594 A1* | 1/2016 | Yilmaz ................. | H04W 36/30 370/332 |

(Continued)

*Primary Examiner* — Asad M Nawaz
*Assistant Examiner* — Najeeb Ansari
(74) *Attorney, Agent, or Firm* — Fish & Richardson P.C.

(57) ABSTRACT

Provided are a method of performing measurement and a device supporting the method. According to one embodiment of the present invention, a method for performing measurement in a wireless communication system includes: receiving a first indication of the measurement from a serving cell; performing the measurement on neighbor cells; determining that the UE has a valid measurement result, based on a preconfigured threshold; and transmitting a second indication indicating that UE has the valid measurement result to the serving cell, based on the first indication.

6 Claims, 7 Drawing Sheets

(56) References Cited

U.S. PATENT DOCUMENTS

| | | | |
|---|---|---|---|
| 2016/0037425 A1* | 2/2016 | Van Lieshout | H04W 36/08 370/332 |
| 2016/0044569 A1* | 2/2016 | Lunden | H04W 36/0058 370/331 |
| 2017/0367085 A1* | 12/2017 | Chakraborty | H04W 36/0072 |
| 2018/0063736 A1* | 3/2018 | Sadeghi | H04W 72/0446 |
| 2018/0084451 A1* | 3/2018 | Fukuta | H04W 24/10 |
| 2018/0109982 A1* | 4/2018 | Zheng | H04W 76/18 |
| 2018/0213457 A1* | 7/2018 | Tang | H04W 36/0072 |
| 2019/0313292 A1* | 10/2019 | Burbidge | H04W 36/0061 |

* cited by examiner

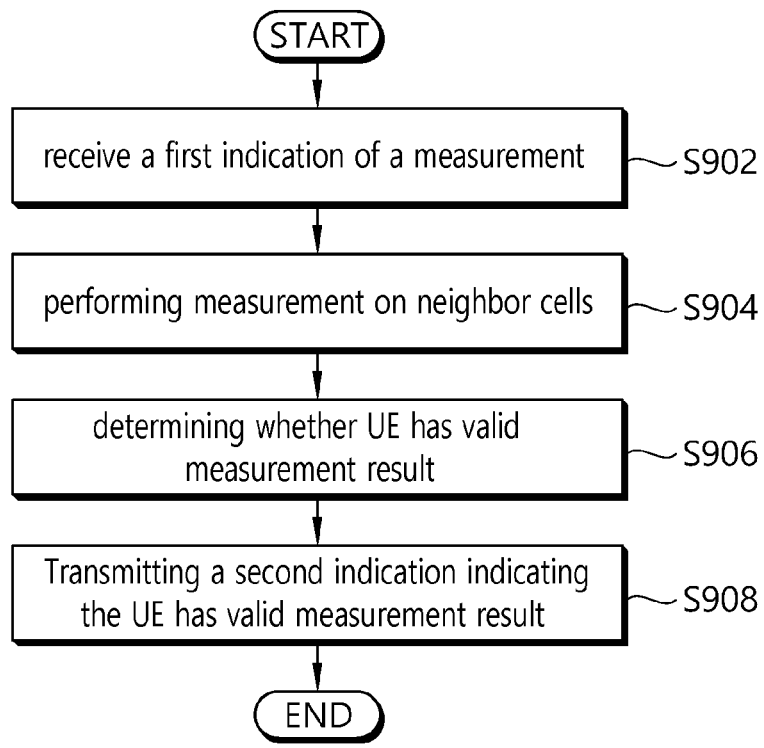
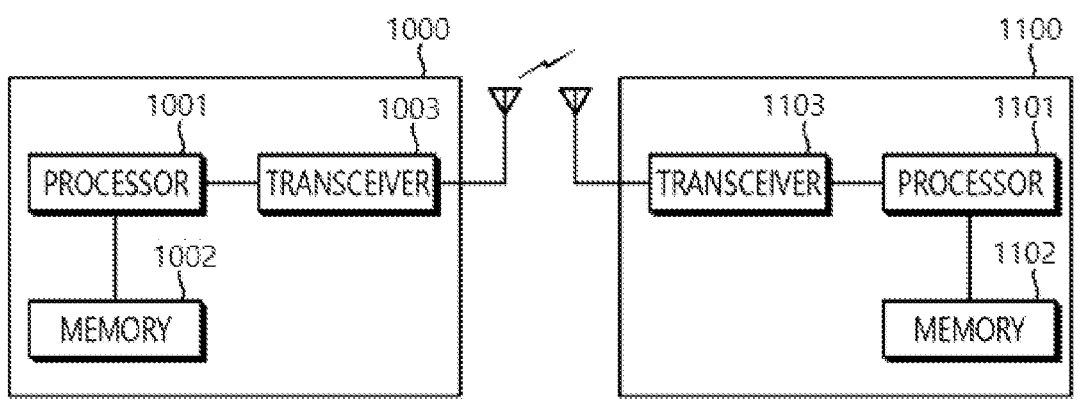

METHOD FOR PERFORMING MEASUREMENT AND DEVICE SUPPORTING THE SAME

CROSS-REFERENCE TO RELATED APPLICATIONS

Pursuant to 35 U.S.C. § 119 (e), this application claims the benefit of U.S. Provisional Application No. 62/529,477 filed on Jul. 7, 2017, the contents of which are all hereby incorporated by reference herein in their entirety.

BACKGROUND OF THE INVENTION

Field of the Invention

The present invention relates to a wireless communication system, and more particularly, to a method performing measurement by a UE, and a device supporting the same.

Related Art

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, in carrier aggregation (CA) or dual multiple connectivity (DC), a serving cell may need to add SCells which have good qualities. To find suitable SCells, the serving cell should indicate UE to measure neighbor cells. Then, the UE may measure qualities of neighbor cells, and report the result of the measurement.

SUMMARY OF THE INVENTION

According to a prior art, a UE is configured to transmit whole information on measurement result to the network, so it requires much UE power consumption.

According to one embodiment of the present invention, a method for performing, by a user equipment (UE), measurement in a wireless communication system is provided. The method comprises receiving a first indication of the measurement from a serving cell; performing the measurement for neighbor cells; determining that the UE has a valid measurement result, based on a preconfigured threshold; and transmitting a second indication indicating that UE has the valid measurement result to the serving cell, based on the first indication.

The valid measurement result may be better than the preconfigured threshold.

The measurement may be performed in RRC IDLE state or RRC INACTIVE state.

The second indication may be transmitted during radio resource control (RRC) connection establishment procedure.

The method may further comprise transmitting the valid measurement result to the network, upon receiving a request of the valid measurement result from the network.

The valid measurement result may be transmitted via radio resource control (RRC) connection setup complete message or RRC connection resume complete message.

The valid measurement result may be used to add SCells for carrier aggregation (CA) or dual connectivity (DC) by the serving cell.

The first indication may be broadcasted via system information.

The first indication may be transmitted via a paging message including identity of the UE.

According to another embodiment of present invention, a user equipment (UE) in a wireless communication system is provided. The UE comprises a tranceiver for transmitting or receiving a radio signal; and a processor coupled to the transceiver, the processor configured to: receive a first indication of the measurement from a serving cell; perform the measurement for neighbor cells; determine that the UE has a valid measurement result, based on a preconfigured threshold; and transmit a second indication indicating that UE has the valid measurement result to the serving cell, based on the first indication.

The valid measurement result may be better than the preconfigured threshold.

The measurement may be performed in RRC IDLE state or RRC INACTIVE state.

The second indication may be transmitted during radio resource control (RRC) connection establishment procedure.

The processor may be further configured to transmit the valid measurement result to the network, upon receiving a request of the valid measurement result from the network.

The valid measurement result may be transmitted via radio resource control (RRC) connection setup complete message or RRC connection resume complete message.

The valid measurement result may be used to add SCells for carrier aggregation (CA) or dual connectivity (DC) by the serving cell.

The first indication may be broadcasted via system information.

The first indication may be transmitted via a paging message including identity of the UE.

BRIEF DESCRIPTION OF THE DRAWINGS

FIG. 9 shows an example of a method for performing measurement according to an embodiment of the present invention.

FIG. 10 shows a communication system to implement an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
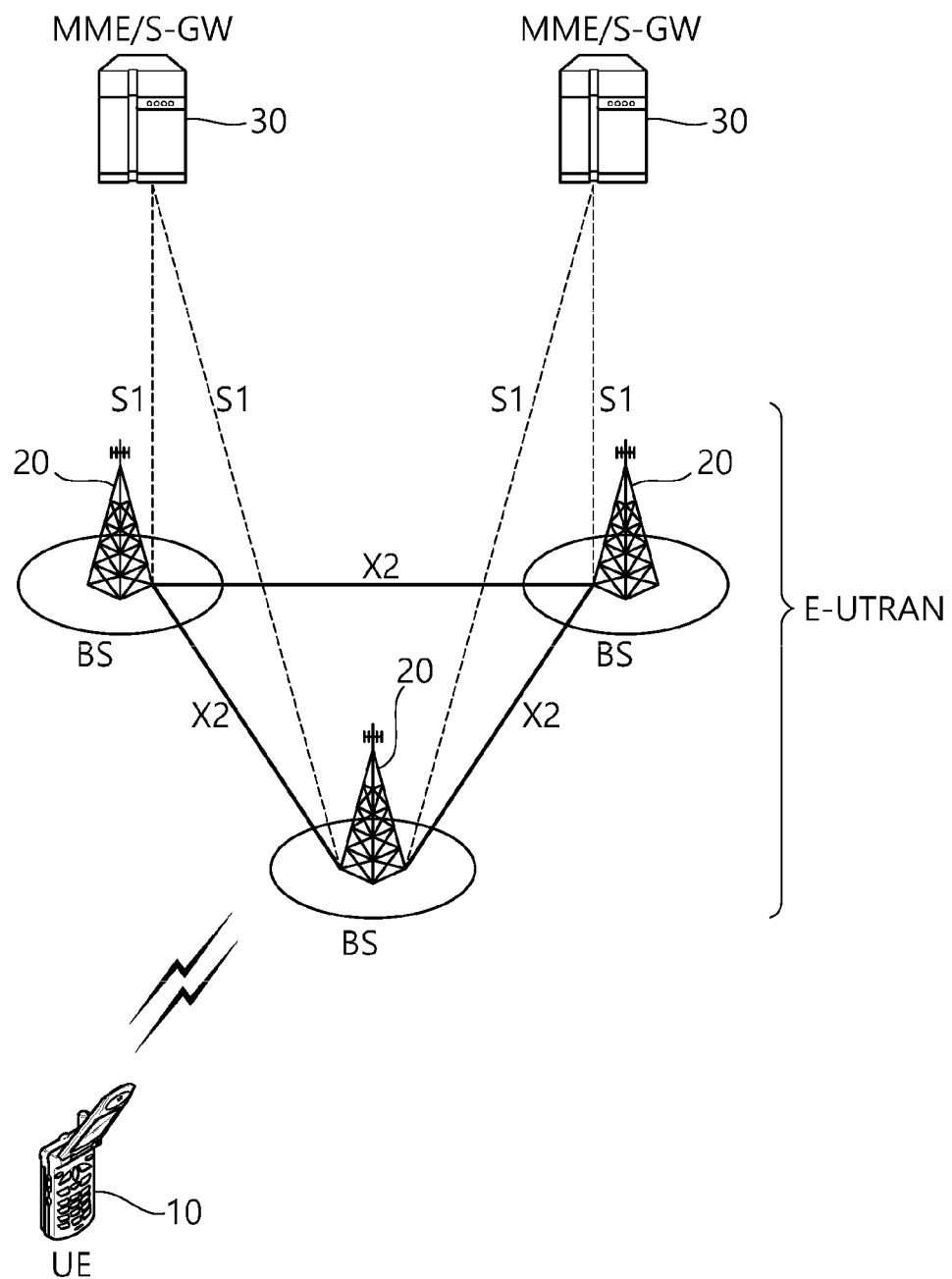
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
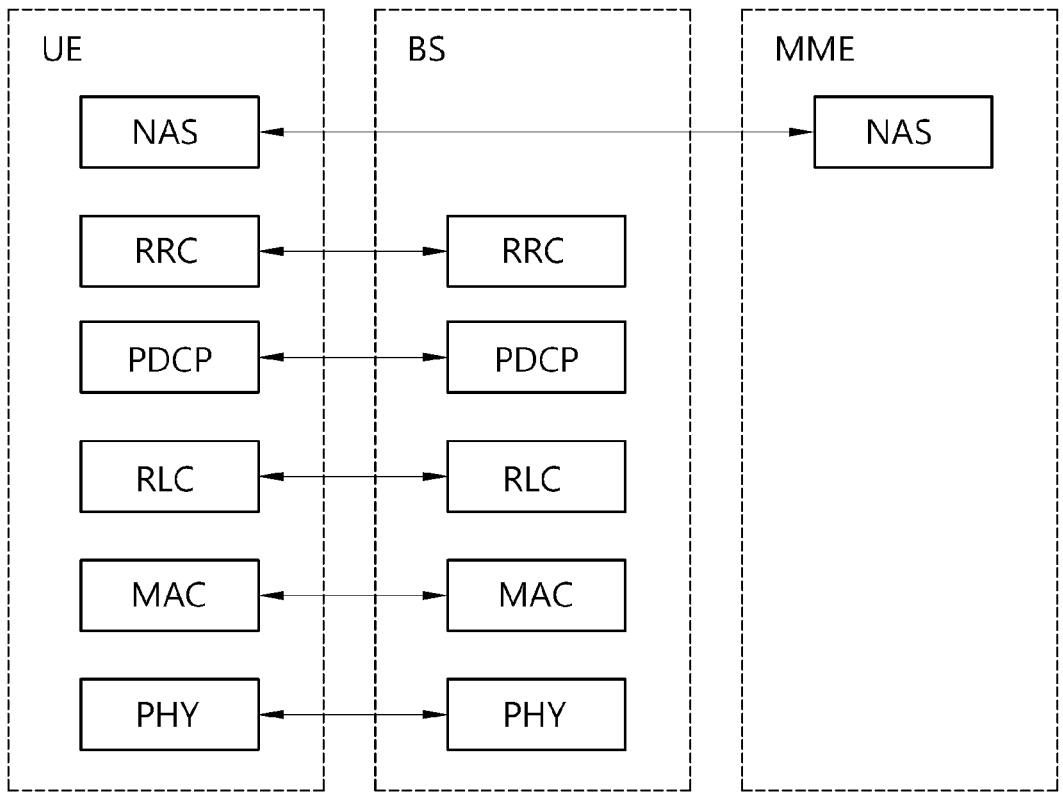
FIG. 2 shows a block diagram of a control plane protocol stack of an LTE system.
Figure 3:
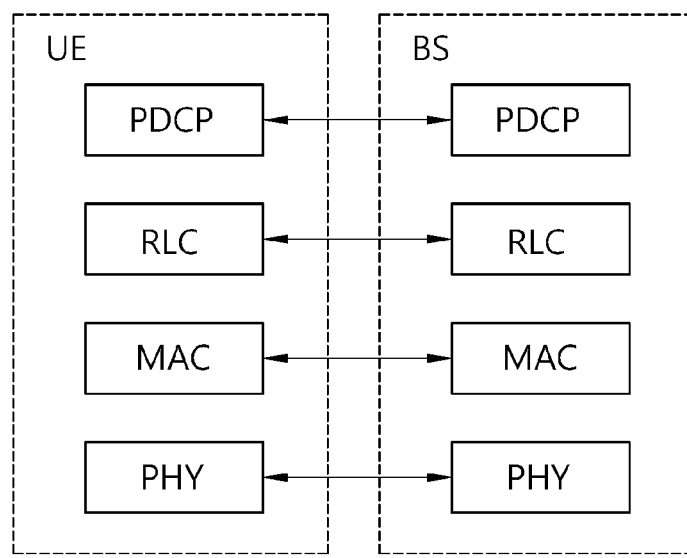
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a 5G network structure is described.

Figure 4:
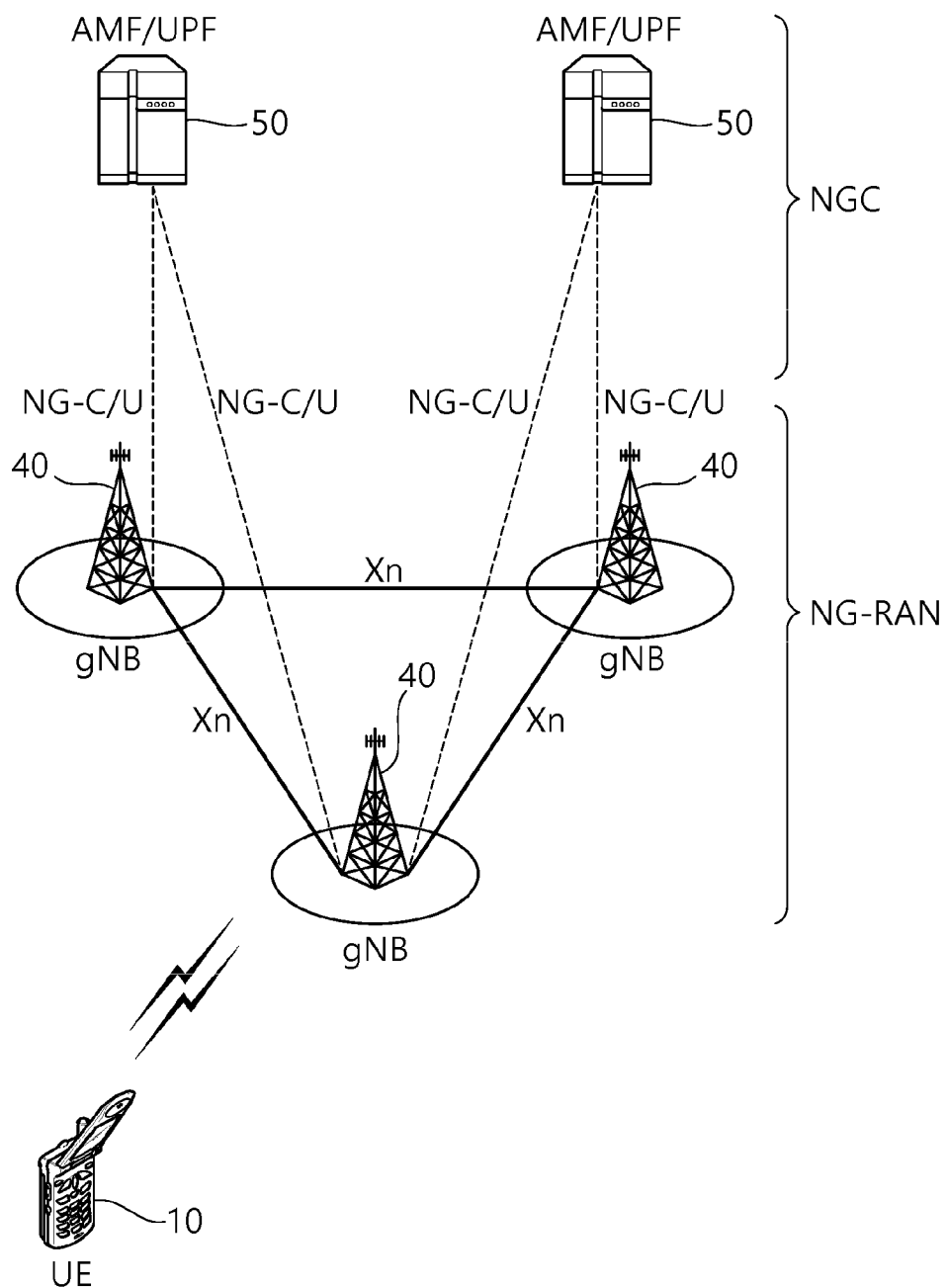
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE State of a UE is Described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

Hereinafter, IDLE measurement in LTE is described.

When evaluating Srxlev and Squal of non-serving cells for reselection purposes, the UE shall use parameters provided by the serving cell. Following rules are used by the UE to limit needed measurements:

If the serving cell fulfils Srxlev>SIntraSearchP and Squal>SIntraSearchQ, the UE may choose not to perform intra-frequency measurements.

Otherwise, the UE shall perform intra-frequency measurements.

The UE shall apply the following rules for E-UTRAN inter-frequencies and inter-RAT frequencies which are indicated in system information and for which the UE has priority:

For an E-UTRAN inter-frequency or inter-RAT frequency with a reselection priority higher than the reselection priority of the current E-UTRA frequency the UE shall perform measurements of higher priority E-UTRAN inter-frequency or inter-RAT frequencies.

For an E-UTRAN inter-frequency with an equal or lower reselection priority than the reselection priority of the current E-UTRA frequency and for inter-RAT frequency with lower reselection priority than the reselection priority of the current E-UTRAN frequency:

If the serving cell fulfils Srxlev>SnonIntraSearchP and Squal>SnonIntraSearchQ, the UE may choose not to perform measurements of E-UTRAN inter-frequencies or inter-RAT frequency cells of equal or lower priority unless the UE is triggered to measure an E-UTRAN inter-frequency which is configured with redistributionInterFreqInfo.

Otherwise, the UE shall perform measurements of E-UTRAN inter-frequencies or inter-RAT frequency cells of equal or lower priority.

The UE reports measurement information in accordance with the measurement configuration as provided by E-UTRAN. E-UTRAN provides the measurement configuration applicable for a UE in RRC_CONNECTED by means of dedicated signalling, i.e. using the RRCConnectionReconfiguration or RRCConnectionResume message. The UE can be requested to perform the following types of measurements:

Intra-frequency measurements: measurements at the downlink carrier frequency(ies) of the serving cell(s).

Inter-frequency measurements: measurements at frequencies that differ from any of the downlink carrier frequency (ies) of the serving cell(s).

Inter-RAT measurements of UTRA frequencies.

Inter-RAT measurements of GERAN frequencies.

Inter-RAT measurements of CDMA2000 HRPD or CDMA2000 1×RTT or WLAN frequencies.

CBR measurements.

Hereinafter, measurements in NR is described.

For the cell level mobility driven by RRC, the baseline of the RRM measurement framework for DL is the one specified for LTE (measurement object, measurement ID, reporting configuration). The DL RRM measurement should be performed based on a common framework regardless of network and UE beam configurations (e.g. number of beams). As for the event triggered reporting, Event A1 to A6 like the ones specified for LTE are at least to be supported with potential modifications. Other events may also be studied for NR. Measurement report contains at least cell level measurement results.

A UE in RRC_CONNECTED should be able to perform RRM measurements on always on idle RS (e.g. NR-PSS/SSS) and/or CSI-RS. The gNB should be able to configure RRM measurements via dedicated signalling to be performed on CSI-RS and/or idle RS. The event triggered reporting can be configured for NR-PSS/SSS and for CSI-RS for RRM measurements. At least, Even A1 to A6 can be configured for NR-PSS/SSS. It is FFS which events can be configured for CSI-RS.

In the multi-beam operation, the UE in RRC_CONNECTED measures at least one or more individual DL beams. The gNB should have the mechanisms to consider the measurement results of those DL beams for handover. This mechanism is needed at least to trigger inter-gNB handover and to optimise handover ping-pong and failure. The UE should be able to distinguish between the beams from its serving cell and the beams from neighbour cells. The UE should be able to learn if a beam is coming from its serving cell. Cell level signalling quality for the DL RRM measurement can be derived from N best beams, if detected, where the value of N can be configured to 1 or more than 1. This does not preclude the DL RRM measurement on a single beam. Measurement report may contain the measurement results of the N best beams if the UE is configured to do so by the gNB.

Meanwhile, in carrier aggregation (CA) or dual multiple connectivity (DC), a serving cell may need to add SCells which have good qualities. To find suitable SCells, the serving cell should indicate UE to measure neighbor cells. Then, the UE may measure qualities of neighbor cells, and report the result of the measurement. In this case, it takes time to report measurement result upon RRC connection procedure is completed. If UE reports measurement results of neighbor cells to the serving cell upon RRC connection setup, the serving cell is able to start carrier aggregation or dual multiple connectivity by adding SCells immediately to the UE based on the reported measurement results. However, UE in IDLE state or INACTIVE state doesn't know when to establish RRC connection. So it is undesirable that the UE always performs neighbor cell measurement during IDLE state or INACTIVE state, because it is enough that if the measurement for carrier aggregation (CA) or dual connectivity (DC) is performed shortly before RRC connection setup.

Hereinafter, a method for performing measurement for a neighbor cell by a UE in IDLE state or INACTIVE state according to an embodiment of present invention is provided. In this description, the measurement according to an embodiment of present invention may be referred as an additional measurement. The additional measurement may be performed for adding SCells in CA or DC, in addition to conventional measurements. The additional measurement may be performed in case that RRC connection procedure begins, so that the UE may report the measurement result as soon as the RRC connection procedure is completed. At the same time, the additional measurement may be performed in restricted condition, so that the UE may avoid the case that the UE always performs neighbor cell measurement during IDLE state or INACTIVE state. Further, when the UE has valid measurement results upon performing the additional measurement, then the UE may notify it to the network. According to an embodiment of present invention, the UE may initiate the additional measurement if upper layers, such as NAS layer, request establishment or resume of an RRC connection while the UE is in RRC_IDLE or RRC_INACTIVE, or if it receives paging message including its identity and/or if it receives the additional measurement indication. Then the UE may report the results of the additional measurement to serving cell during or shortly after RRC connection establishment procedure. Thus, when entering RRC_CONNECTED state, the UE is able to report the measurement results to network immediately with the minimum of UE power consumption for neighbor cell measurement.

According to an embodiment of present invention, when the UE in IDLE state or INACTIVE state receives paging message related to mt-call, the NAS layer of the UE may request establishment or resume of an RRC connection. In this case, the UE may initiate performing measurement for neighbor cells, when the NAS layer requests establishment or resume of an RRC connection or when the UE receives paging message which caused initiating RRC connection procedure.

The UE in IDLE state or INACTIVE state may initiate the additional measurement upon receiving the additional measurement indication from a network. The additional measurement indication can be provided via paging message.

Further, the paging message may include the additional measurement indication and identity of the UE. The additional measurement indication may be signaled per UE or per a group of UEs. Alternatively, the additional measurement indication may be broadcasted, e.g. via system information. The UE may initiate the additional measurement if upper layers request establishment or resume of an RRC_connection and the additional measurement indication is broadcast from serving cell.

Further, the UE may receive an additional measurement configuration. The UE may perform the additional measurement in accordance with the additional measurement configuration. The UE may receive the additional measurement configuration when leaving RRC_CONNECTED state, e.g. via RRC Connection Release message or RRC Connection Resume message. Alternatively, the UE may receive the additional measurement configuration in broadcast manner, e.g. via system information. Alternatively, there may be no separate additional measurement configuration. In this case, the UE may perform the additional measurement in accordance with normal measurement configuration in IDLE state or INACTIVE state which is broadcasted via system information.

If available RRC connection establishment or resume cause is included in the additional measurement configuration, the UE may initiate the additional measurement only when it is going to establish RRC connection due to an establishment or resume cause which is indicated in the additional measurement configuration. Desirably, UE may initiate the additional measurement when MAC layer starts random access channel (RACH) procedure, e.g. upon sending MSG1. Or, UE may initiate the additional measurement when RRC layer starts RRC connection establishment procedure, e.g. upon sending RRC connection setup request. According to an embodiment of present invention, if the additional measurement configuration indicates only 'mo-Data' and establishmentCause received from higher layers is set to 'mo-Signaling' then the UE may not initiate the additional measurement. According to another embodiment of present invention, if the additional measurement configuration indicates only 'mt-Data' and establishmentCause received from higher layers is set to 'mt-Data', then the UE may initiate the additional measurement.

Though some threshold has been configured for the UE to restrict the neighbor cell measurement when serving cell quality is good, the UE may perform the additional measurement regardless of the serving cell quality. In prior art, measurement for neighbor cell is performed when a specific condition, such as the condition that a serving cell quality is worse than the threshold, is met. However, according to an embodiment of present invention, the UE may perform the measurement for neighbor cell when the UE receives the request of establishment or resume of the RRC connection, or when the UE receives additional measurement indication, regardless of the serving cell quality. If measurement object is included in the additional measurement configuration, the UE may perform the additional measurement only for the frequency of cell indicated by the measurement object.

If report event is included in the additional measurement configuration, the UE may report the additional measurement results only when the report event is satisfied for some measured cell. If report event is included in the additional measurement configuration, the UE may report the additional measurement results only for cell for which the report event is satisfied. For example, the UE may report the result of measurement, when the serving cell quality is worse than threshold 1 and neighbor cell is better than threshold 2.

UE may stop the additional measurement if it acquire available measurement results to report, or after reporting the measurement results to serving cell.

Figure 5:
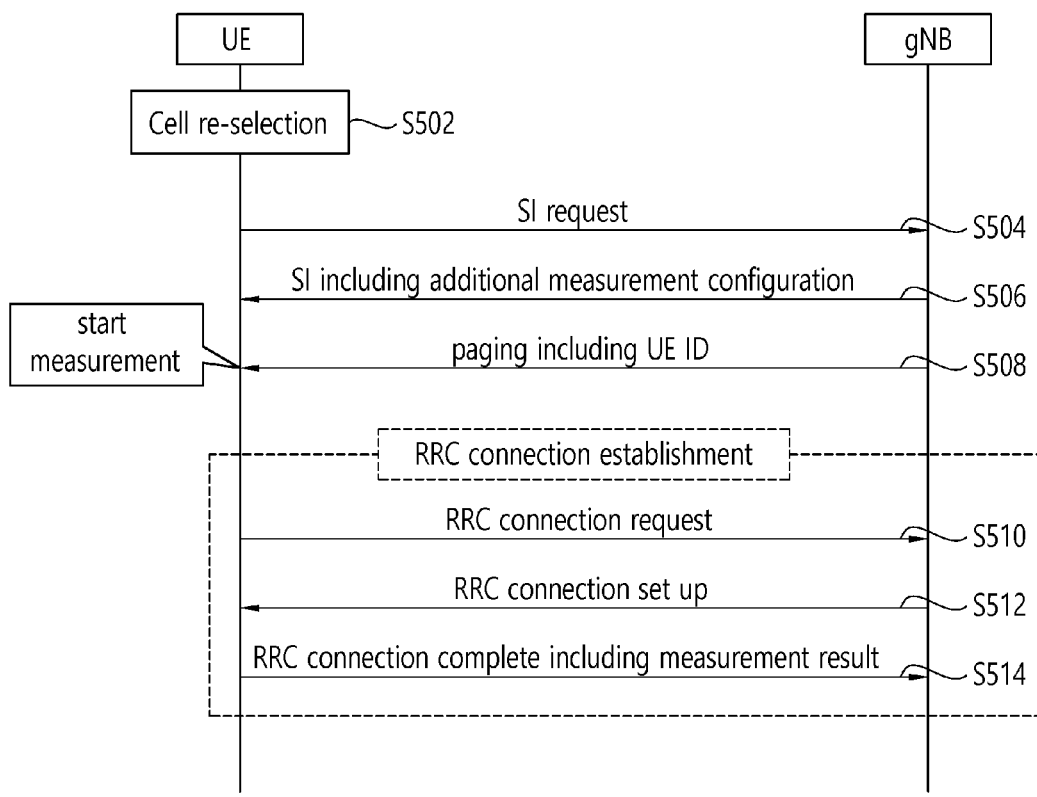
FIG. 5 shows an example of a method for performing measurement according to an embodiment of the present invention.

FIG. 5 shows an example of a method for performing measurement according to an embodiment of the present invention. In this embodiment of present invention, the UE is in RRC_IDLE state as an initial state.

In step S502, the UE in RRC_IDLE state changes serving cell by performing cell reselection procedure.

In step S504, the UE may send the system information requests to acquire additional measurement configuration.

In step S506, the UE may receive the additional measurement configuration. The additional measurement configuration may include at least one of measurement object, report event and establishment or resume cause. For example, the measurement object may be carrier frequency #1, #2 and #4. The report event may indicate that neighbor is better than threshold. The establishment or resume cause may be mo-Data and mt-Access.

In step S508, upon receiving the paging message including UE identity (ID) and additional measurement indication, UE may initiate the additional measurement. According to the example, the UE may measure frequency #1, #2 and #4 regardless of serving cell quality. Then, the UE may find two cells, cell S and cell W, for which the report event is satisfied. On the other hands, the UE may initiate the additional measurement, when the upper layers request establishment or resume of RRC connection according to the paging message.

In step S510, the UE may initiate RRC connection establishment procedure with establishmentCause 'mt-Access'.

In step S512, the UE may receive RRC connection setup message from the serving cell.

In step S514, the UE may include the additional measurement results of cell S and cell W to the RRC connection message and send it to the serving cell.

Figure 6:
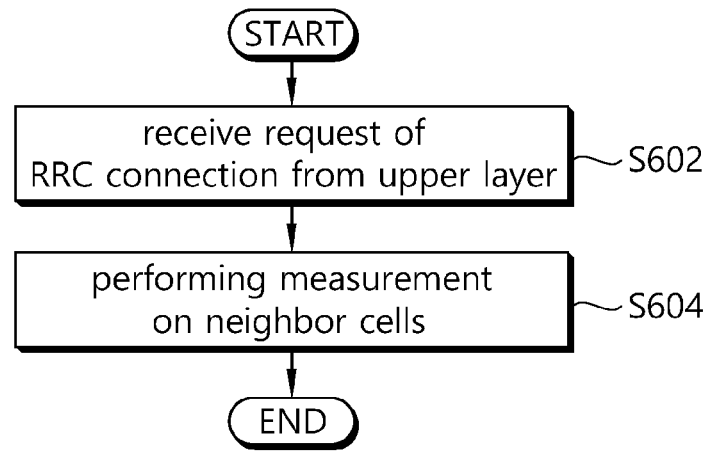
FIG. 6 shows an example of a method for performing measurement according to an embodiment of the present invention.

FIG. 6 shows an example of a method for performing measurement according to an embodiment of the present invention.

In step S602, the UE may receive a request of establishment or resume of a radio resource control (RRC) connection from an upper layer. The upper layer may be non-access stratum (NAS) layer of the UE. The UE may be in RRC IDLE state or RRC INACTIVE state. In step S604, the UE may perform the measurement for neighbor cell according to the request.

Further, the UE may report a result of the measurement to a serving cell, via a RRC connection complete message from a serving cell. The result of the measurement may be used to add SCells for carrier aggregation (CA) or dual connectivity (DC) by the serving cell. The UE may further receive a measurement configuration via system information. The measurement configuration may include at least one of a measurement object, reporting events and establishment or resume of RRC connection cause.

Figure 7:
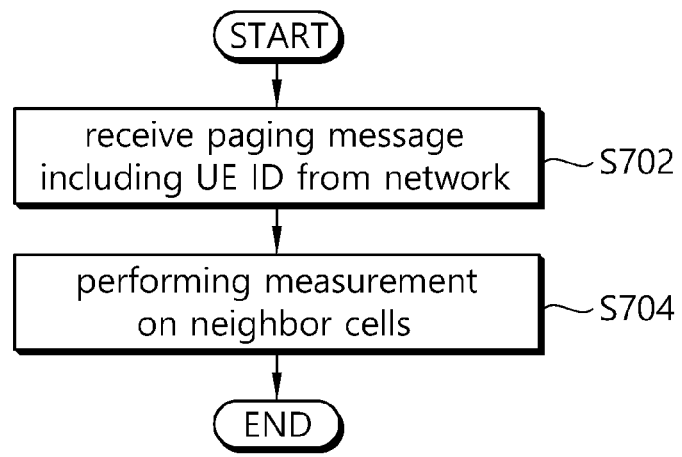
FIG. 7 shows another example of a method for performing measurement according to an embodiment of the present invention.

FIG. 7 shows another example of a method for performing measurement according to an embodiment of the present invention.

In step S702, the UE may receive a paging message including identity of the UE from a network. The UE may be in RRC IDLE state or RRC INACTIVE state. The paging message may be related to a mobile terminated (MO) call. The UE may report a result of the measurement to a serving cell, via a RRC connection complete message. The result of the measurement may be used to add SCells for carrier aggregation (CA) or dual connectivity (DC) by the serving cell. In step S704, the UE may perform the measurement for neighbor cell, upon receiving the paging message.

Further, the UE may receive an indication of measurement from the network. The UE may further receive a measurement configuration via system information. The measurement configuration may include at least one of a measurement object, reporting events and establishment or resume of RRC connection cause.

According to another aspect of present invention, if the UE has valid measurement results after performing the additional measurement, then the UE may notify it to the network (for example, eNB or gNB). In specific, during RRC connection establishment procedure, UE may indicate whether it has valid measurement results of the additional measurement to network, e.g. via MSG3 (=RRC Connection setup request or resume request message). In this embodiment of present invention, valid measurement results may indicate measurement results which are better than a pre-configured threshold value among measurement results of the additional measurement. During RRC connection establishment procedure, if UE receives the additional reporting indication from network and it has valid measurement results of the additional measurement, the UE may report the additional measurement results to the network. The additional reporting indication may be included in the MSG4 (=RRC connection setup/resume message). The additional measurement results may be included in the MSG5 (=RRC connection setup/resume complete message). Desirably, the additional reporting indication may be included in MAC CE in MSG2. In this case, the additional measurement results may be reported to network via MSG 3. Each of the above-described messages is for understanding purposes, and is not limited to a specific message. However, according to embodiments of present invention, the messages may be one of messages used in RRC connection procedure.

Figure 8:
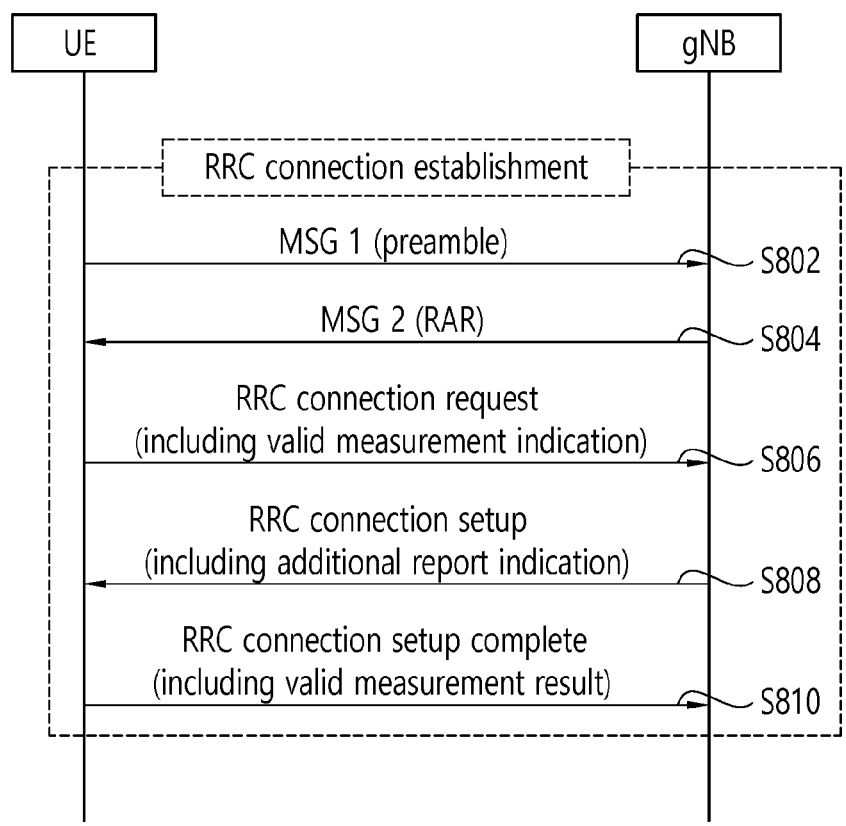
FIG. 8 shows an example of a method for performing measurement according to an embodiment of the present invention.

FIG. 8 shows an example of a method for performing measurement, according to an embodiment of the present invention.

In step S802, the UE may transmit MSG1. Upon transmitting the MSG1, UE may initiate the additional measurement.

In step S804, the UE may receive MSG2.

In step S806, the UE may transmit the valid measurement indication to the network. The valid measurement indication may indicate whether the UE has valid measurement results or not. In other words, the valid measurement indication may indicate whether the UE has measurement results to report or not. That is, in this description, whether the UE has measurement results to report or not may be one of measurement reporting conditions. Thus, the valid measurement indication may be used for notifying the network of that the report of measurement result is available. If the UE has valid measurement results of the additional measurement, UE may set the valid measurement indication to TRUE. If not, the UE may set it to FALSE. The UE may transmit the valid measurement indication to the network during RRC establishment procedure. For example, the UE may transmit the valid measurement indication via RRC connection request message, RRC connection setup complete message or RRC connection resume complete message. More specifically, if the UE receives the additional measurement indication and the UE has valid measurement results of the additional measurement, the UE may transmit the valid measurement indication to the network.

In step S808, the UE may receive additional reporting indication from the network. The additional reporting indication may indicate that the network inquires the UE to transmit the results of additional measurement. The additional reporting indication may be included in RRC connection setup message.

In step S810, if the UE receives the additional reporting indication, the UE may report the additional measurement results via MSG5. MSG5 may be one of RRC connection setup complete message or RRC connection resume complete message. If not, the UE doesn't report the additional measurement results.

FIG. 9 shows an example of a method for performing measurement, according to an embodiment of the present invention.

In step S902, the UE may receive a first indication of the measurement from a serving cell. The first indication may be broadcasted via system information. The first indication may be transmitted via a paging message including identity of the UE.

In step S904, the UE may perform the measurement for neighbor cells. The measurement is performed in RRC IDLE state or RRC INACTIVE state. In step S906, the UE may determine that the UE has a valid measurement result, based on a preconfigured threshold. The valid measurement result may be better than the preconfigured threshold.

In step S908, the UE may transmit a second indication indicating that UE has the valid measurement result to the serving cell, based on the first indication. The second indication is transmitted during radio resource control (RRC) connection establishment procedure.

Further, the UE may transmit the valid measurement result to the network, upon receiving a request of the valid measurement result from the network. The valid measurement result is transmitted via radio resource control (RRC) connection setup complete message or RRC connection resume complete message. The valid measurement result is used to add SCells for carrier aggregation (CA) or dual connectivity (DC) by the serving cell.

FIG. 10 shows a communication system to implement an embodiment of the present invention.

A UE 1000 includes a processor 1001, a memory 1002, and a transceiver 1003. The memory 1002 is coupled to the processor 1001, and stores a variety of information for driving the processor 1001. The transceiver 1003 is coupled to the processor 1001, and transmits and/or receives a radio signal. The processor 1001 implements the proposed functions, procedures, and/or methods. In the aforementioned embodiments, an operation of the first network node may be implemented by the processor 1001.

A network node 1010 includes a processor 1011, a memory 1012, and a transceiver 1013. The memory 1012 is coupled to the processor 1011, and stores a variety of information for driving the processor 1011. The transceiver 1013 is coupled to the processor 1011, and transmits and/or receives a radio signal. The processor 1011 implements the proposed functions, procedures, and/or methods. In the aforementioned embodiments, an operation of the second network node 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein.

The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
   receiving, from a serving cell, an additional measurement configuration for a measurement in a radio resource control (RRC) idle state, wherein the additional measurement configuration includes a threshold and one or more of available RRC connection establishment causes;
   receiving, from the serving cell, a paging massage including an additional measurement indication and an identity (ID) of the UE;
   initiating a RRC connection establishment procedure with a specific RRC connection establishment cause in response to the paging message;
   upon receiving the paging message including the additional measurement indication and the ID of the UE, performing the measurement on neighbor cells in the RRC idle state based on that the specific RRC connection establishment cause is included in the one or more of available RRC connection establishment causes;
   determining that the UE has a valid measurement result based on the threshold;
   transmitting, while performing the RRC connection establishment procedure, information informing that UE has the valid measurement result to report;
   receiving a request of the valid measurement result from the serving cell, upon completing the RRC connection establishment procedure; and
   transmitting the valid measurement result to the serving cell in response to the request,
   wherein the valid measurement result is used to add SCells for carrier aggregation (CA) or dual connectivity (DC) by the serving cell.

2. The method of claim 1, wherein the valid measurement result is transmitted via radio resource control (RRC) connection setup complete message or RRC connection resume complete message.

3. The method of claim 1, wherein the additional measurement configuration is broadcasted via system information.

4. A user equipment (UE) configured to operate in a wireless communication system, the UE comprising:
  a transceiver for transmitting or receiving a radio signal; and
  a processor coupled to the transceiver,
  the processor configured to:
  control the transceiver to receive, from a serving cell, an additional measurement configuration for a measurement in a radio resource control (RRC) idle state, wherein the additional measurement configuration includes a threshold and one or more of available RRC connection establishment causes;
  receiving, from the serving cell, a paging massage including an additional measurement indication and an identity (ID) of the UE;
  initiating a RRC connection establishment procedure with a specific RRC connection establishment cause in response to the paging message;
  upon receiving the paging message including the additional measurement indication and the ID of the UE, perform the measurement on neighbor cells in the RRC idle state based on that the specific RRC connection establishment cause is included in the one or more of available RRC connection establishment causes;
  determine that the UE has a valid measurement result based on the threshold;
  control the transceiver to transmit, while performing the RRC connection establishment procedure, information informing that UE has the valid measurement result to report;
  control the transceiver to receive a request of the valid measurement result from the serving cell, upon completing the RRC connection establishment procedure; and
  control the transceiver to transmit the valid measurement result to the serving cell in response to the request,
  wherein the valid measurement result is used to add SCells for carrier aggregation (CA) or dual connectivity (DC) by the serving cell.

5. The UE of claim 4, wherein the valid measurement result is transmitted via radio resource control (RRC) connection setup complete message or RRC connection resume complete message.

6. The UE of claim 4, wherein the additional measurement configuration is broadcasted via system information.

* * * * *